(12) United States Patent
Mathew

(10) Patent No.: US 7,509,346 B2
(45) Date of Patent: Mar. 24, 2009

(54) SYSTEM AND METHOD TO RE-ASSOCIATE CLASS DESIGNER SHAPES TO THE TYPES THEY REPRESENT

(75) Inventor: George Mathew, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 11/025,475

(22) Filed: Dec. 29, 2004

(65) Prior Publication Data

US 2006/0156282 A1 Jul. 13, 2006

(51) Int. Cl.
*G06F 17/30* (2006.01)
(52) U.S. Cl. ............... 707/104.1; 707/100; 707/103 R; 707/103 Y
(58) Field of Classification Search ......... 707/100–102, 707/104.1, 103 R, 103 Y; 717/108, 113, 717/126, 168
See application file for complete search history.

(56) References Cited

U.S. PATENT DOCUMENTS

| 6,199,198 | B1 * | 3/2001 | Graham | 717/105 |
| 6,604,105 | B1 * | 8/2003 | Roth | 707/100 |
| 2002/0170048 | A1 * | 11/2002 | Zgarba et al. | 717/168 |
| 2005/0027757 | A1 * | 2/2005 | Kiessig et al. | 707/204 |

* cited by examiner

*Primary Examiner*—Cam-Linh Nguyen
(74) *Attorney, Agent, or Firm*—Amin, Turocy & Calvin, LLP

(57) ABSTRACT

The subject invention provides a system and/or method that facilitates synchronizing a diagram file with a code allowing a data representation application (e.g., class modeling tool) to accurately display at least a type, a member and relationships therewith. An association component can associate an orphaned shape from the diagram file to a type within an edited code wherein such edit entails a renaming of a type. The association component can utilize a heuristic search in order to associate an orphaned shape with a type. Moreover, the association component can utilize a distance metric and/ or match confidence in order to indicate and associate a plurality of orphaned shapes to a plurality of types with a high probability.

19 Claims, 12 Drawing Sheets

SYSTEM AND METHOD TO RE-ASSOCIATE CLASS DESIGNER SHAPES TO THE TYPES THEY REPRESENT

TECHNICAL FIELD

The present invention generally relates to computer programming, and more particularly to systems and methods that facilitate synchronizing source code with a data application (e.g., data representation application).

BACKGROUND OF THE INVENTION

Applications (e.g., code editors) that can be employed to manipulate electronic data (e.g., code, documents, images, audio . . . ) often utilize a representation of the data to facilitate modifying (e.g., creating, editing, and removing) all or selective portions of such data. With these applications, the representation typically is generated when a user performs an action (e.g., launches an application and opens a document) that indicates a desire to modify the data. The user can employ the representation to indirectly modify the data via the representation, wherein a modification made to the representation is eventually translated to the original data in the application.

After a representation is generated, the data can be directly modified. When the data is modified, the representation no longer reflects a current state of the data so the modification needs to be translated to the representation. Similar to above, the modification is eventually translated to the data representation. In addition, other applications can be concurrently invoked to manipulate the data. These applications can work directly on the data, utilize an existing representation or elicit generation of other representations. Likewise, the above noted modifications (made to the representation and data) must be translated to all other representations and any modification to another representation must be translated to the data and its respective representations in order to synchronize the data with associated representations.

Conventionally, modification translation (for the above scenarios) from data or representation to representation or data is delayed. For example, with many applications the user commits changes, for example, after some period of time or upon exiting the application. However, this type of commitment can introduce delay in the translation, which can result in periods where the data does not reflect the representation and the representation does not reflect the data. The foregoing presents several challenges to ensuring the integrity of the data. For example, when data and an associated representation do not reflect each other, the representation can be utilized to make or attempt to make erroneous modification to the data.

By way of example, a programmer may desire to modify source code. Upon invoking an editor, a representation of the source code can be generated and utilized by the programmer to edit the source code. For example, the programmer may add a method to a class in the representation. However, if the class is removed from the source code after the representation is generated and the representation is not updated to reflect the class removal, the representation can be modified with the addition of the new method, even though the class no longer exists in the source code. Such editing complications can arise, for example, with a plurality of users editing code wherein such synchronization is crucial to produce efficient results. When the modification (the new method) to the representation is eventually translated from the representation to the source code, unexpected and/or undesired results may occur. For example, the method can be erroneously translated and not discovered until the source code is compiled, which can necessitate debugging and rolling back the modification. In another example, the invalid translation may cause the application to crash or lock-up. Additionally, the translation may result in lost code or a corrupt file. In still another example, the invalid translation may occur without an indication, wherein running the executable code may render undesired results.

Traditionally, tags within source code have been utilized in order to mitigate errors associated with the synchronization of source code and data representation applications. However, tags within source code can become cumbersome and/or over-bearing for a program and/or programmer. Moreover, source code containing multiple tags can overwhelm and end up controlling the code. For example, a programmer can utilize tags throughout a source code, yet such tags would flood the source code to defeat the purpose as a higher-level source of interpretation. Moreover, tags (e.g., XML tags) make merging difficult based at least upon merge conflicts. Additionally, developers and/or programmers are limited in flexibility with code containing auto-generated tags. Turning to FIG. 12, a sample portion of code is illustrated wherein tags are utilized to facilitate synchronization, wherein two taglines of code are referenced by 1202. As seen from the example, tags can be extremely counter-productive within a development process.

In view of the above, there is a need to improve upon and or provide systems and/or methods relating to the synchronization of code with a data representation application.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate synchronizing an edited code with a diagram file in order to provide a proper display from a data representation application (e.g., class modeling tool, UML, Class Designer, etc.). During the editing of code, the diagram file can be non-accessible (e.g., closed) wherein the changes (e.g., edits and/or refactoring) are not synchronized with the diagram file utilized by the data representation application (e.g., Class Designer, class modeling tool, UML, etc.). Based upon this non-synchronization of the diagram file and edited code, shapes (e.g., that represent a type within the data representation application) can be unassociated with a type from the code. A receiver component can receive the edited code and the diagram file from a code editor and Class Designer, respectively. Furthermore, an association component can utilize the diagram file and the code in order to associate a shape with a type when the code is edited while the diagram file is not accessible.

In accordance with one aspect of the subject invention, the association component utilizes a heuristic search to associate a shape to a type it represents in order for the data representation application to properly display the types, members and/or relationships of the source code. The association component can store additional information upon the saving of the diagram file wherein the additional information can be, but not limited to, a hash value constructed from the member names of the type that the shape was associated to upon saving. Moreover, the association component can compare the stored hash value with a hash value for the types in either the substantially similar file or the substantially similar namespace as the shapes original type and associate the shape with a type based at least upon that comparison.

Furthermore, the association component can employ a default technique in order to associate a shape with a type when the diagram file is open and/or accessible when an edit to code is implemented. Edits and/or refactoring of code while the diagram file is open and/or accessed allow synchronization and a proper display from the data representation application. The default technique allows the association component to utilize the fully qualified name of the type stored in the diagram file for each shape that is displayed.

In accordance with another aspect of the subject invention, the association component utilizes a distance metric to indicate the correlation of a shape with a type wherein a match confidence provides the optimization of associating a plurality of shapes to a plurality of types. The distance metric and/or match confidence can contain an adjustable threshold (e.g., minimum and/or maximum) that determines whether a shape and a type are to be associated. Furthermore, the association component can use a greedy algorithm to match up a plurality of orphaned shapes to types, using the match-confidence that the shape-type pairs generate.

In accordance with yet another aspect of the subject invention, the association component further includes a notification component wherein a user is notified of an unassociated shape and/or the associations made based on the association component. The notification component can notify a user by generating, for example, a text document, a comment in code, a visual image in relation to the diagram file, an audio alert, a video, a table, a tag within code, an email to the user, an attachment, an update to a website, etc. Moreover, the notification component can notify the user of at least one of associations to be made, associations made, determined edits that affect associations, distance metrics associated to associations, and/or match confidences for each association.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
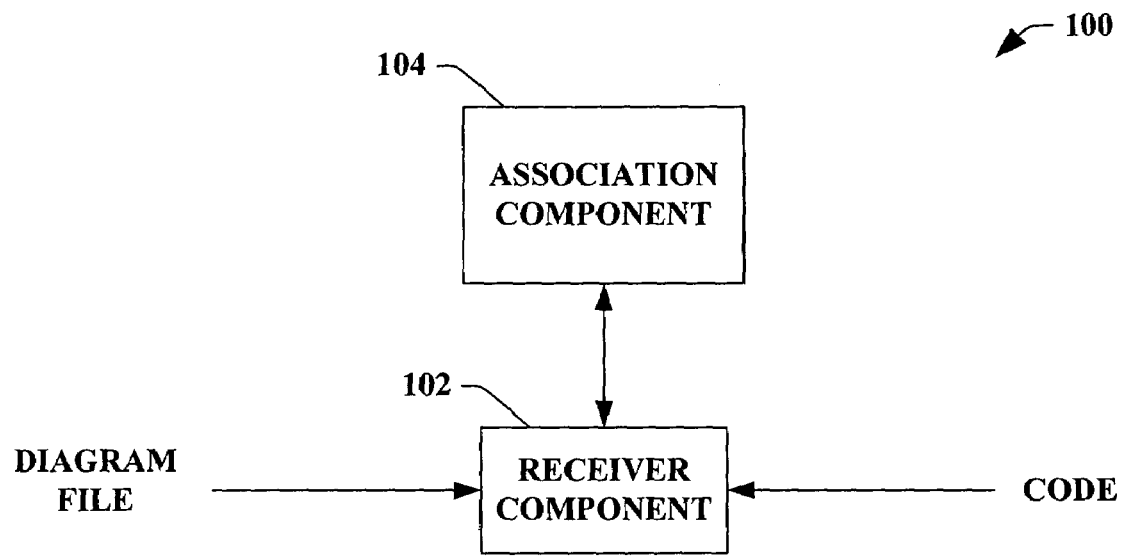
FIG. 1 illustrates a block diagram of an exemplary system that facilitates synchronizing code with a data representation application in accordance with an aspect of the subject invention.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as described herein. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates synchronizing a source code and a diagram file associated with a data representation application (e.g., class modeling tool) to provide a re-association of a shape to a type that is represented. A data representation application (e.g., class modeling tool) displays types, members, and relationships on a visual design surface such that a visual representation of the code (e.g., source code) is displayed. The diagram file received by the receiver component 102 contains visual information for the data representation application (e.g., class modeling tool such as, but not limited to, a Class Designer, UML, etc.). For instance, accessing the diagram file employs the class designer to display visual information related to a visual representation with shapes based at least in part upon the source code. Additionally, the receiver component 102 receives code (e.g., source code) allowing an association component 104 to utilize a plurality of techniques in order to associate a type from the code with a shape from the diagram file, thereby reducing orphaned shapes within the data representation application.

For instance, visual information for a diagram (e.g., display of shapes representing types, members, and relationships) can be generated by a class designer based at least upon a diagram file that is generated based on source code. During refactoring and/or editing the source code, the diagram file can be non-accessible (e.g., closed), wherein any changes (e.g., edits and refactoring to the source code) are not synchronized with the diagram file and the class designer (e.g., utilizing such diagram file). Based upon this non-synchronization of the diagram file and edited source code, shapes can be unassociated with a type from the source code (e.g., each shape in the diagram file is associated to a single type in code). These unassociated shapes are deemed "orphaned" shapes. Since the orphaned shapes are not properly synchronized with a type in the source code, the class designer is unable to visually display the diagram file properly (e.g., containing the necessary shapes associated with the various types within code). The association component 104 can be utilized to re-associate orphaned shapes with the types that are represented allowing an accurate portrayal of the source code via the diagram file and data representation application (e.g., class designer).

The association component 104 facilitates synchronizing the source code with the diagram file by utilizing a search to link an orphaned shape to a type. For instance, an orphaned shape is a shape contained within a diagram file wherein synchronization with the code has failed based on, for example, a code edit and/or refactoring. It is to be appreciated that within the data representation application, a shape within the diagram file corresponds to a type within source code wherein the association component 104 utilizes such correspondence to determine appropriate linkage between such shape and such type. By employing the association component 104, synchronization errors between source code and data representation application are mitigated.

The association component 104 can utilize a heuristic search based on hash values in order to determine the appropriate association of the type to the shape. The heuristic search provides an efficient search by employing an evaluation function that can score a node in a search tree according to the proximity of a target and/or goal. In accordance with one aspect of the subject invention, the heuristic search can utilize, for example, a hash value comparison to associate the shape with a type. Such hash value creation, comparison, and matching allows the proper synchronization and/or display of shapes contained in a diagram file based on the code.

In accordance with an aspect of the subject invention, the association component 104 can utilize a heuristic search (e.g., a hash value technique) by storing additional information in the diagram file. When the diagram file for a data representation application is created and/or accessed, this additional information is stored upon closing and/or saving. The additional information stored in the diagram file can be the filename that the type was located in and a hash value (e.g., 256 bit hash) constructed from the member names of the type that the shape was associated. This additional information, referred to as the hash value stored for the shape, is utilized in the hash comparison in order to associate an orphaned shape with a type. However, it is to be appreciated that the 256 bit-array can store information, wherein such storage is more compact than storing volumes of data in the diagram file.

If a shape is not associated to a type (e.g., a shape within the diagram is not synchronized with a type from code), an orphaned shape results. The association component 104 can compare the original hash value stored for the shape with a potential hash value for the types in either the same file (e.g., diagram file) or the same namespace as the shapes original type. A namespace, for instance, is an abstract zone and/or area that can be populated by names, terms, and/or words. The namespace uniquely identifies sets of names such that no ambiguity exists when objects have different origins but the same names are mixed together. Additionally, each name within a namespace is unique.

Upon calculation of the potential hash value for the types in either the same file or the same namespace as the shapes original type, the association component 104 utilizes a distance metric in order to indicate the similarity between the type and the shape. It is to be appreciated the association component 104 can utilize any hash value and/or technique in order to employ the distance metric. The distance metric (as discussed in more detail infra) provides the association component 104 to associate a shape to a type wherein the association generates a highest match confidence. Moreover, the association component 104 can utilize a threshold in order to provide a maximum and/or minimum match confidence threshold.

For example, a user can edit code with a code editor wherein changes can be made that rename a type and/or a plurality of types. When the diagram file is not open, the changes cannot be tracked resulting in a non-synchronized code in relation to the diagram file with associated shapes and the types within the code. This non-synchronization generates orphaned shapes which are unassociated to types. Thus, the association component 104 facilitates associating orphaned shapes to the types they represent. Prior to a last save and/or exit, the association component 104 stores a filename that the type was located and a hash value calculated from the member names of the type that it was associated with. If an orphaned shape exists, the association component 104 compares the original hash value (e.g., additional information stored upon save and/or close of the diagram file) with a hash value for the types in either the same file or the same namespace as the shapes original type. The comparison can be based at least upon a distance metric and match confidence levels providing an optimization of association.

It is to be appreciated that a default technique can be employed by the association component 104 wherein a shape can be linked to a type utilizing a fully qualified name of the type since that name has not be changed through the editing and/or refracting of the code. In other words, if the name of a type has not changed, the diagram file can associate the shape to the type it represents by linking the names.

Figure 2:
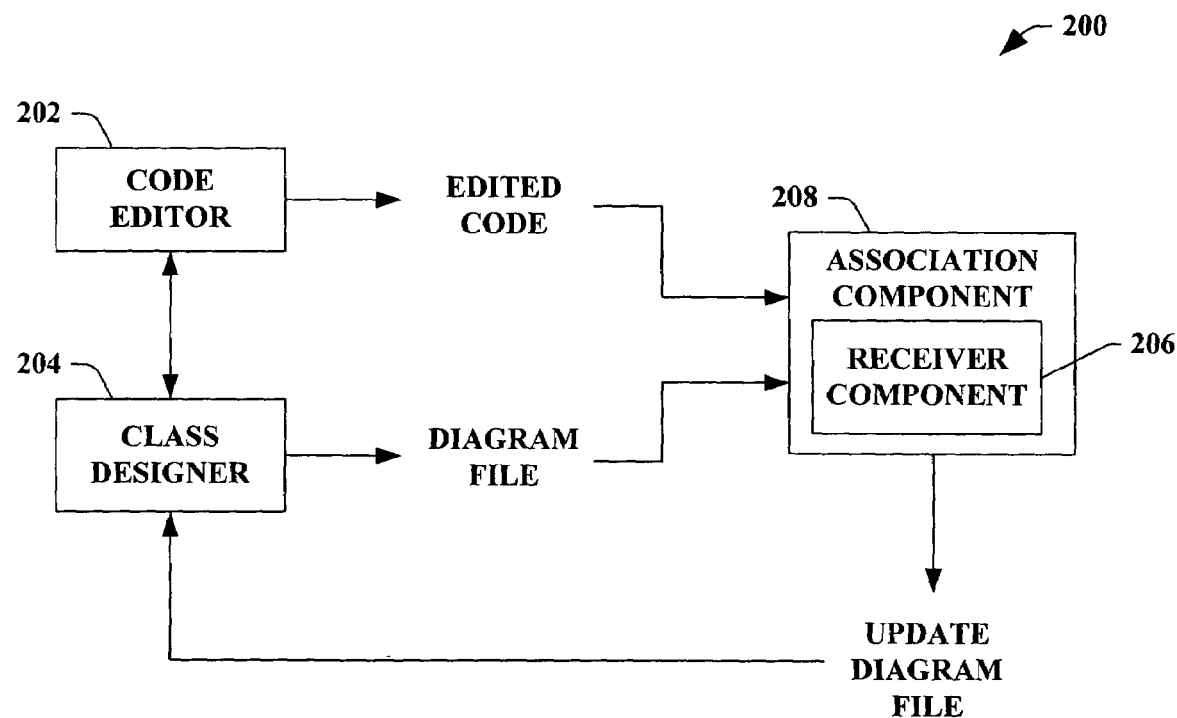
FIG. 2 illustrates a block diagram of an exemplary system that facilitates synchronizing edited code with a diagram file in accordance with an aspect of the subject invention.

FIG. 2 illustrates a system 200 that facilitates synchronizing edited source code with a diagram file in order to provide a proper display from a data representation application (e.g., class modeling tool, UML, Class Designer, etc.). A code editor 202 can be employed allowing code to be generated wherein such code can contain, for example, various classes, types, variables, etc. For example, the code editor 202 enables a user to manipulate code wherein such manipulations can be, but not limited to, generate, edit, refract, import, export, test, compile, run, etc. The source code can be created and/or edited utilizing the code editor 202 wherein such code is the master for a data representation application such as, for example, a class designer 204. The class designer 204 is a class modeling tool that displays types, related members, and relationships therewith on a visual design surface. The class designer 204 can store data in a diagram file in order to facilitate such representative display of code. Moreover, the class designer 204 utilizes a shape and/or a plurality of shapes to correspond to a type within code.

The edited code from the code editor 202 and the diagram file from the class designer 204 are received by a receiver component 206 providing an association component 208 data to associate a shape with a type. It is to be appreciated the receiver component 206 can be integrated into the association component 208 and/or a stand alone component. Upon receiving the diagram file and edited code, the association component 208 associates a shape from the diagram file with a type from the source code. When the edited code consists of a renaming of a type, the source code will not be synchronized with the diagram file unless the diagram file was open and/or accessed during such renaming. Under these circumstances, the class designer 204 cannot properly display the types, members and relationships of the code based at least upon the renaming of the type. Thus, shapes created by the class designer 204 based on the renamed types within the code will be orphaned (e.g., non-associated to a type based upon the renaming of such type).

For example, a user can create code within a code editor 202 wherein a class can be named "Food" with various members and relationships therewith. The user can refract and/or edit such code to update various preferences. For instance, the user can change the name of the class "Food" to "Meat." If the change in code is implemented while a diagram file in the class designer 204 is open and/or accessed, synchronization of code can be done utilizing a fully qualified name of the type (e.g., since the name of the type has not changed). However, if the diagram file is not open and/or accessed the code is not synchronized, and orphaned shapes are resultant. Thus, from the diagram file and class designer perspective, the shape associated with "Food" will no longer be associated to the type class "Meat" based upon the renaming of the type. Therefore, the class designer cannot properly display the types, members and relationships since the type "Food" is renamed (e.g., which the class designer is unaware). In other words, the shape associated to type class "Food" is considered an orphaned shape since "Food" is no longer associated to a type within the code (e.g., based at least upon the renaming of the type).

Figure 7:
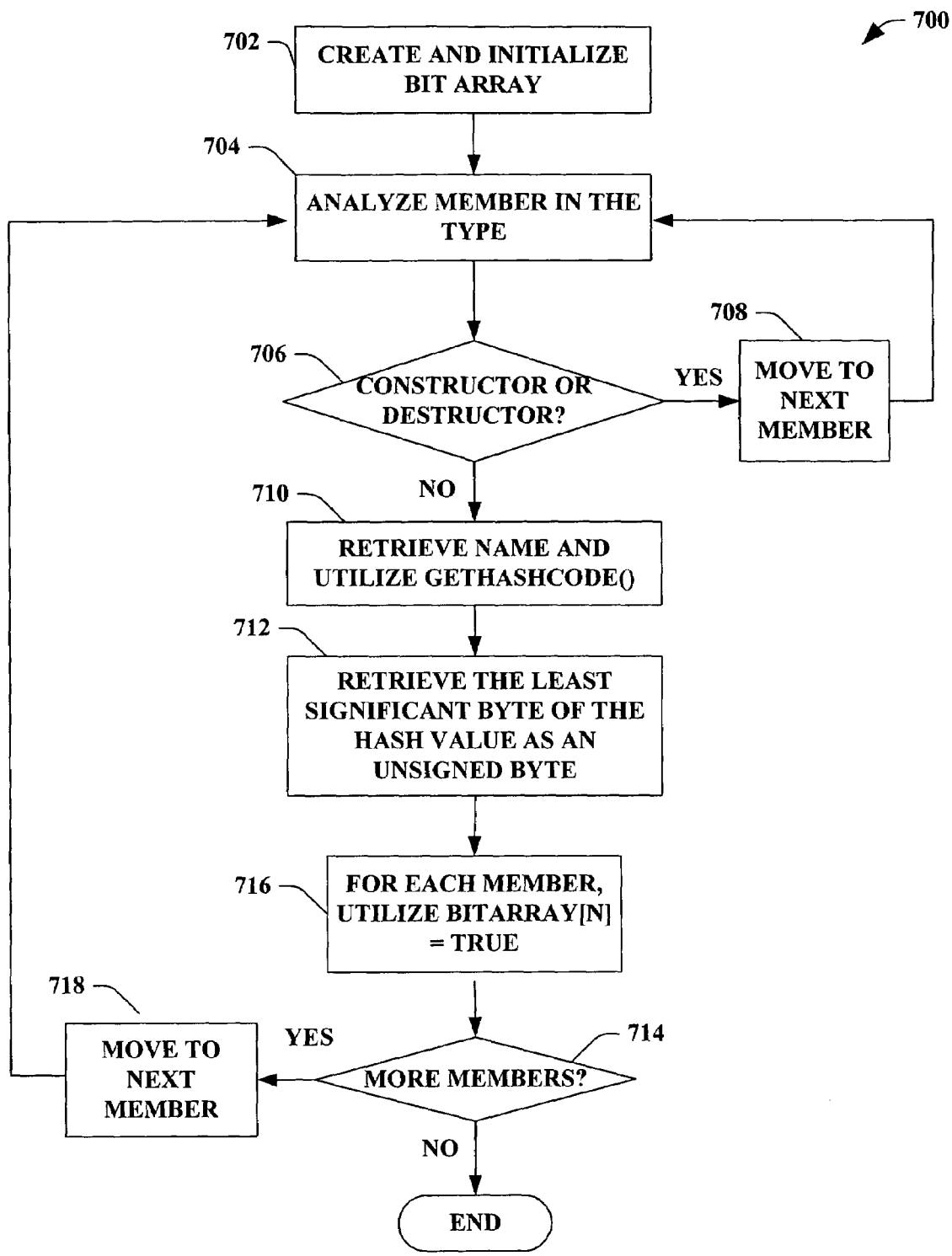
FIG. 7 illustrates a flow chart of an exemplary methodology that facilitates synchronizing code with a data representation application in accordance with an aspect of the subject invention.

In order to associate an orphaned shape to a type, the association component 208 stores additional information in the diagram file in preparation for the orphaned type situation. It is to be appreciated the association component 208 does not change the source code and/or file(s) by utilizing tags and/or any substantially similar technique. Upon the closing and/or saving of the diagram file, the association component 208 stores a filename that the type was located in and a hash value constructed from member names of the type that the shape is associated. It is to be appreciated various hash value techniques can be utilized, such as, for example, a 256 bit hash calculated as shown in FIG. 7. In particular, the hash technique should make it easy to calculate the distance between two hash values, with the distance being continuous between 0 and 1 (when normalized) and not just a Boolean value. Moreover, the association component 208 utilizes such additional stored information to associate an orphaned shape to a type. A comparison between the stored hash value for the shape and the hash value for the types in either the same file or the same namespace as the shapes of the original shape. The association component 208 further utilizes a distant metric based at least upon the hash values. It is to be appreciated the distance metric can indicate the similarity and/or correlation of a shape and the original type and associates a shape to a type accordingly. It is to be appreciated the association component 208 can provide an updated diagram file to the class designer 204 and/or update portions of the diagram file.

Moreover, the association component 208 can associate a plurality of orphaned shapes to the associated types. Given a plurality of orphaned types, the association component 208 utilizes a match confidence wherein, for example, a greedy algorithm associates a shape with a type provided a threshold (e.g., minimum and/or maximum) is met. By utilizing the match confidence, the association component 208 provides optimized association of orphaned shapes with types wherein the class designer 204 can accurately portray a visual representation of edited code.

In another example, a user can edit source code such that multiple types are renamed to refract and/or edit code. Once the association component 208 computes the distance metric based at least upon a hash value, associating shapes to types is determined by a greedy algorithm. The greedy algorithm allows the association of the highest match confidence for a shape and a type. The association component 208 provides a variable threshold setting in order to provide specific tailoring to facilitate associating a shape and a type. Thus, a threshold of, for instance, 80% can be implemented wherein a shape and type must relate based at least upon the distance metric more than 80%.

Figure 3:
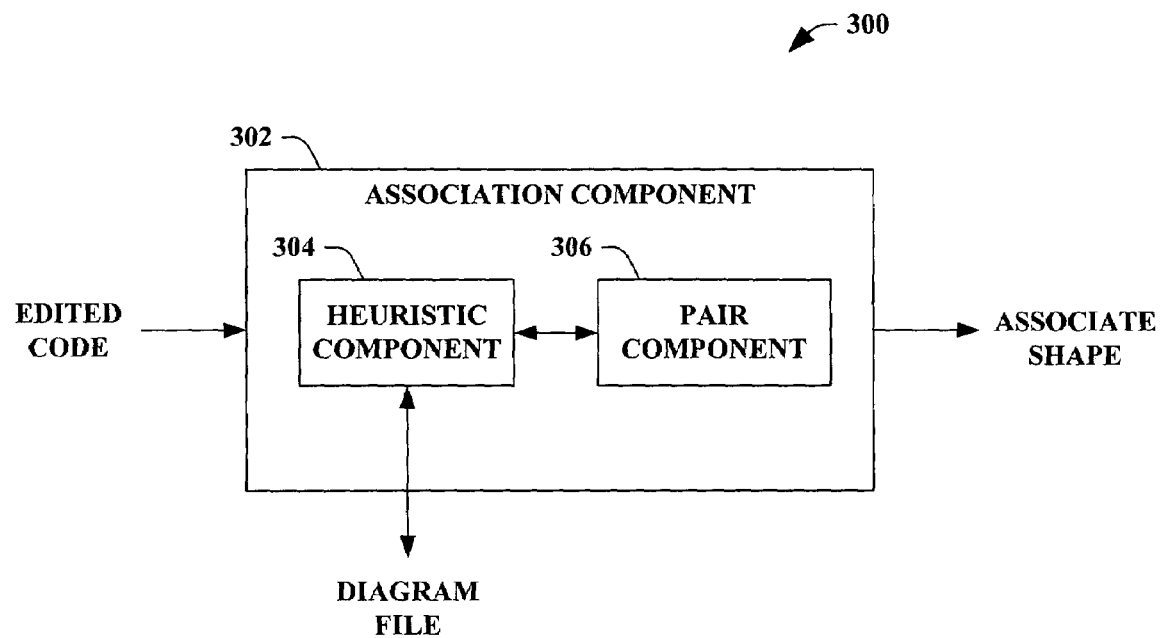
FIG. 3 illustrates a block diagram of an exemplary system that facilitates synchronizing edited code with a data representation application in accordance with an aspect of the subject invention.

FIG. 3 illustrates a system 300 that facilitates synchronizing a code with a data representation application (e.g., class modeling tool), wherein a shape within a diagram file is associated to a type within a source code. The association component 302 can receive edited code and a diagram file, wherein the edited code contains at least a renaming of a type. Moreover, the editing change within the code occurs when the diagram file is closed and/or inaccessible. Renaming a type without the diagram file open deems a number of shape(s) to be orphaned the number of orphaned shapes being based at least upon the number of types renamed. The association component 302 provides the association of orphaned shapes to the type they represent.

The association component 302 further includes a heuristic component 304 that utilizes heuristic techniques in order to facilitate synchronizing edited code with the diagram file. It is to be appreciated the heuristic component 304 can utilize any heuristic search in order to calculate a distance metric. In accordance with one aspect of the subject invention, the heuristic component 304 utilizes a hash value in order to do a heuristic search to determine which type to link a shape. The heuristic component 304 can store additional information in the diagram file wherein the additional information is the filename that the type was located and a hash value constructed from the member names of the type that the shape was associated to when the diagram file was saved and/or closed. Furthermore, the heuristic component 304 determines a hash value for the types in either the same file or the same namespace as the shapes original type. It is to be appreciated the heuristic component 304 can utilize various heuristic techniques in order to determine a proper association of a shape and a type. It is to be appreciated that the heuristic method includes the calculation of the hash value and such calculation of a distance metric utilizes the hash value.

For example, a user can generate code within a code editor, wherein a renaming of a type from "Car" to "Automobile" exists while the diagram file is not accessed and/or open. Thus, an orphaned shape will exists based upon the renaming of the type. The type "Car" is deemed an orphan shape within the diagram file because a type from the code is not associated thereto. Thus, the association component 302 can provide an association of an orphaned shape with a type from the code based at least upon a heuristic search (e.g., utilizing a hash value) done by the heuristic component 304. After the heuristic search, the association component 302 associates the orphaned shape "Car" with the type "Automobile" providing the proper display of shapes in a Class Designer.

Furthermore, the association component 302 further includes a pair component 306 that facilitates associating at least one orphaned shape with a type that is represented by that orphaned shape. The pair component 306 analyzes data from the heuristic component 304 such that an orphaned shape is associated with a type utilizing, for example, a distance metric. The distance metric indicates how close a type is to the original type that the shape was associated with (e.g., before the renaming of the type).

It is to be appreciated that the pair component 306 utilizes the heuristic data to determine a distance metric for the orphaned shapes and potential types. The pair component 306 can utilize any suitable greedy algorithm in order to associate types to orphaned shapes. However, it is to be appreciated that any suitable technique to associate more than one orphaned shape with types can be utilized. For instance, the pair component 306 can utilize a greedy algorithm and/or an averaging technique. The pair component 306 can be utilized when there exists a plurality of orphaned shapes that can be associated with types. It is to be appreciated that the types can provide valid matching coefficients with more than one orphaned shape. Hence, the pair component 306 can utilize a method that assigns types to orphaned shapes according to a criterion. The averaging technique can be utilized such that the orphaned pairs are matched to yield the highest average from combinations of the associations between orphan shapes and potential types. In order to illustrate the possible association techniques, take for example, orphaned shapes S1, S2, and S3 can have as possible type associations T1, T2, T3 having results from the heuristic component 304 as follows:

|    | T1 | T2 | T3 |
|----|----|----|----|
| S1 | 90 | 10 | 80 |
| S2 | 85 | 80 | 60 |
| S3 | 50 | 85 | 60 |

Utilizing a greedy algorithm, the pair component 306 assigns S1 to T1, S2 to T2, and S3 to T3. However, utilizing an averaging technique rather than a greedy algorithm, the pair component 306 assigns S1 to T3, S2 to T1, and S3 to T2—therefore giving the association of shapes to types the highest average of match confidence.

Figure 4:
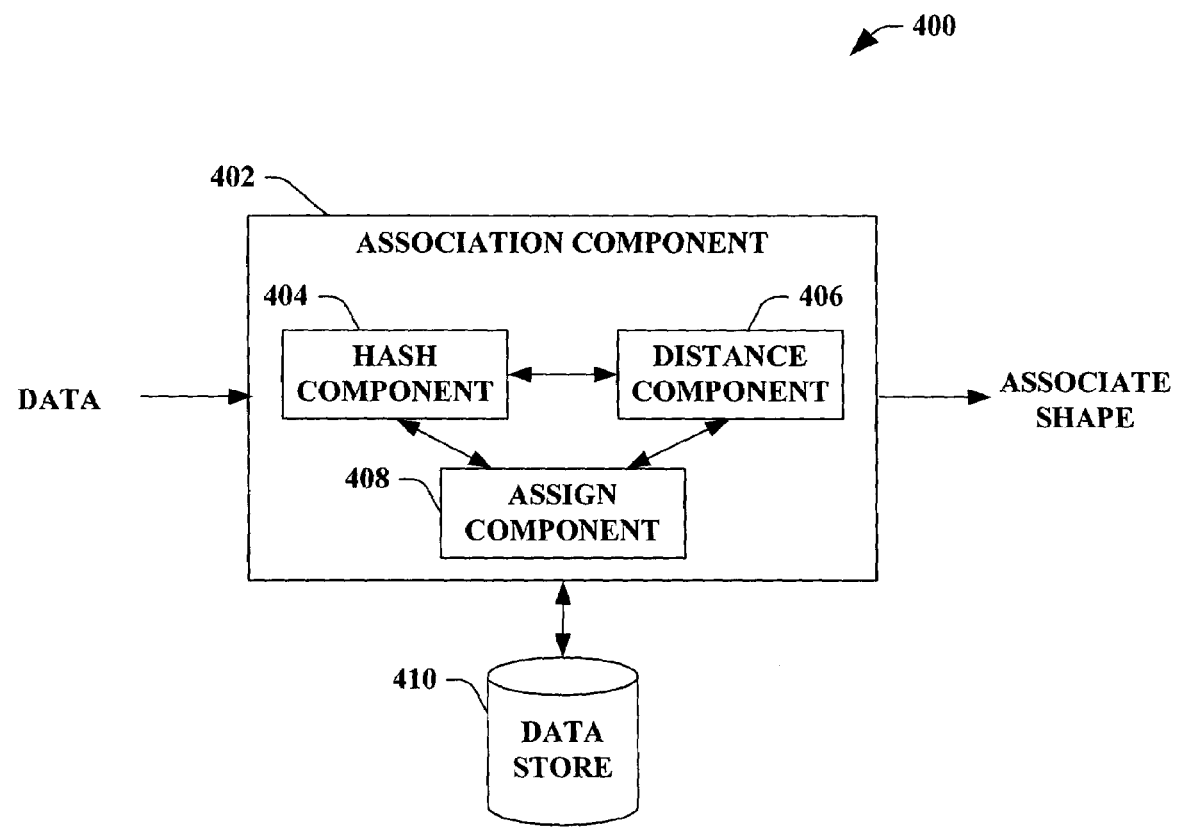
FIG. 4 illustrates a block diagram of an exemplary system that facilitates synchronizing code with a data representation application in accordance with an aspect of the subject invention.

FIG. 4 illustrates a system 400 that facilitates associating a shape with a type by employing an association component 402, which provides a data representation application with proper data in order to display a diagram file. The association component 402 can receive data such as, but not limited to, a diagram file and an edited code. As stated supra, the edited code received is such that a renaming of a type within source code has been implemented without the diagram file being open and/or accessed. Thus, an orphaned shape will result (e.g., a shape unassociated to a type). The association component 402 can store additional information in a diagram file in order to facilitate associating an orphaned shape with a type. Additionally, the association component 402 can utilize a data store 410 in order to store such additional information such as, but not limited to, diagram files, edited code, hash values, data resultant of heuristic search, association results, distance metric data, etc.

Furthermore, the association component 402 includes a hash component 404 allowing a hash value to be generated to facilitate synchronizing the diagram file with the code. Upon saving the diagram file, the fully qualified name of the type, the file that the type resides in, and a hash value (e.g., 256 bit hash value) that is calculated from the names of the members of the type that is represented by each shape is stored. The hash component 404 calculates a hash value for all the types that are displayed on the diagram. It is to be appreciated that the hash component 404 calculates a hash value for the type the shape is associated to upon the closing and/or saving of the diagram file and for the types in either the same file or the same namespace as the shapes original type when the diagram is loaded after a renaming of a type. In other words, the hash component utilizes a hash upon the saving and/or closing of the diagram file, and a hash on types in code for the situation arising when there is an orphaned shape (e.g., renaming a type without the diagram file opening).

For instance, the hash component 404 generates a bit array of 256 bits called bitArray. For the type, the hash component 404 analyzes each member. If the member is a constructor and/or destructor, the hash component 404 continues to the next member of the type. The hash component 404 obtains a 32-bit hash value by retrieving the name of the member and utilizing a function GetHashCode( ). Once the 32-bit hash is obtained, the hash component 404 retrieves a least significant byte of the hash value as an unsigned byte (e.g., this value can be between 0 and 255). Moreover, the hash component 404 can utilize bitArray[n]=true, given the value of the last byte is n. It is to be appreciated the hash component 404 can utilize the data store 410 in order to store and/or save any data related to computing such hash values associated with member names of the types and/or names of the types and/or files the types reside. Moreover, the hash component 404 generates the hash value upon the closing and/or saving of a diagram file and when the diagram file is opened/accessed after a renaming of a type has been implemented.

The association component 402 further includes a distance component 406 that utilizes such hash value data from the hash component 404 in order to calculate a distance metric to indicate the association confidence of a shape with a type. The distance can be calculated between any two hash values. For instance, the distance is calculated between an orphaned shape and types in the same file or namespace as the orphan's original type. When a diagram file is loaded, edits involving name changes that occur without the diagram file being accessed and/or opened generate orphaned shape(s). As stated supra, for each orphaned shape, the hash component 404 analyzes each type that is in the same file and or the same namespace as the shapes original type. Thus, the hash component 404 computes the hash value from which the distance metric it utilized.

The distance component 406 can utilize two 256 bit long bit arrays, for example, A and B. Once received from the hash component 404, a bit array xorArray can be calculated with a bitwise XOR of A and B by the distance component 406. Additionally, the bitwise AND of A and B can be calculated by the distance component 406 which can be referred to as a bit array andArray. For example, the distance component 406 then calculates int numMatches as a number of true bits in andArray; and int numDiffs as the number of true bits in xorArray which is divided by two. Additionally, the distance component calculates a match confidence defined as the following: Match confidence=numMatches/(numdiffs+numMatches); which yields a number between the range of 0 to 1. It is to be appreciated the distance component 406 can calculate the match confidence for each type. Moreover, the distance component 406 can utilize the data store 410 in order to store any data in order to calculate and/or utilize the match confidence.

The association component 406 further includes an assign component 408 that utilizes the data from the distance component 406 to assign a plurality of orphaned shapes to potential types such that a type is assigned to the shape to create the highest match confidence while only assigning one type to an orphaned shape. The assign component 408 creates a class called, for example, ShapeTypeMatch, which contains a reference to an orphaned shape and the type that it represents, wherein the reference is initially null. A collection of ShapeTypeMatch objects named, for example, ShapeTypeMatchCollection can be created by the assign component 408. Additionally, a class called PossibleMatch is created with a reference to ShapeTypeMatch and to a type which also contains a match confidence. Furthermore, the assign component 408 creates a collection of PossibleMatch objects called PossibleMatchCollection with possible associations.

It is to be appreciated the assign component 408 analyzes a plurality and/or all orphaned shapes in order to associate to the types represented. Moreover, for each orphaned shape, the assign component 408 creates a ShapeTypeMatch object called, for example, STMATCH and sets the orphaned shape reference to the current orphaned shape and type reference to null. Additionally, the assign component 408 stores a reference to STMATCH in ShapeTypeMatchCollection. Moreover, the assign component 408 analyzes all types in either the similar file or similar namespace as the original type, wherein the match confidence is compared between the shape and the type. It is to be appreciated the assign component 408 utilizes a threshold wherein a user can determine the minimum and/or maximum for association. For instance, the assign component 408 can utilize a 0.8 threshold and will create a PossibleMatch object, and set its ShapeTypeMatch reference to point to STMATCH. Additionally, the type reference can be set to point to the current type and the match confidence to the generated match confidence. The assign component 408 can then add the PossibleMatch object to PossibleMatchCollection.

After the types in the similar file or similar namespace have been analyzed and the orphaned shapes have been analyzed, the assign component 408 sorts PossibleMatchCollection in match confidence order (e.g., highest match confidence first).

The assign component 408 analyzes each PossibleMatch in PossibleMatchCollection. If the type in the PossibleMatch is assigned to an orphan, the assign component 408 moves to the next item. It is to be appreciated the assign component 408 maintains a hashtable of the fully qualified names of all the types that are assigned from which a lookup can be done with the table. The assign component 408 checks the ShapeTypeMatch object to determine whether the orphaned shape is assigned to a type (e.g., make sure the "assigned-to" reference is null). If assigned, the assign component 408 moves to the next item. Furthermore, the assign component 408 assigns the type to the orphan (e.g., sets the "assign-to" reference in the ShapeTypeMatch object and adds the fully qualified name to the type to the hash table of assigned types). Again, it is to be appreciated the assign component 408 can assign the orphaned shape to a type for any and/or a portion of the orphaned shapes based at least upon a user preference.

The assign component 408 can then utilize ShapeTypeMatchCollection and associate the orphaned shapes to their assigned types. If the assigned type is null, it is to be appreciated the heuristic did not find a type that generated a significant match (e.g., association) for the orphaned shape. The assign component 408 assigns each type to the orphan with the highest match, while also ensuring a single type is associated to a single orphaned shape.

Figure 5:
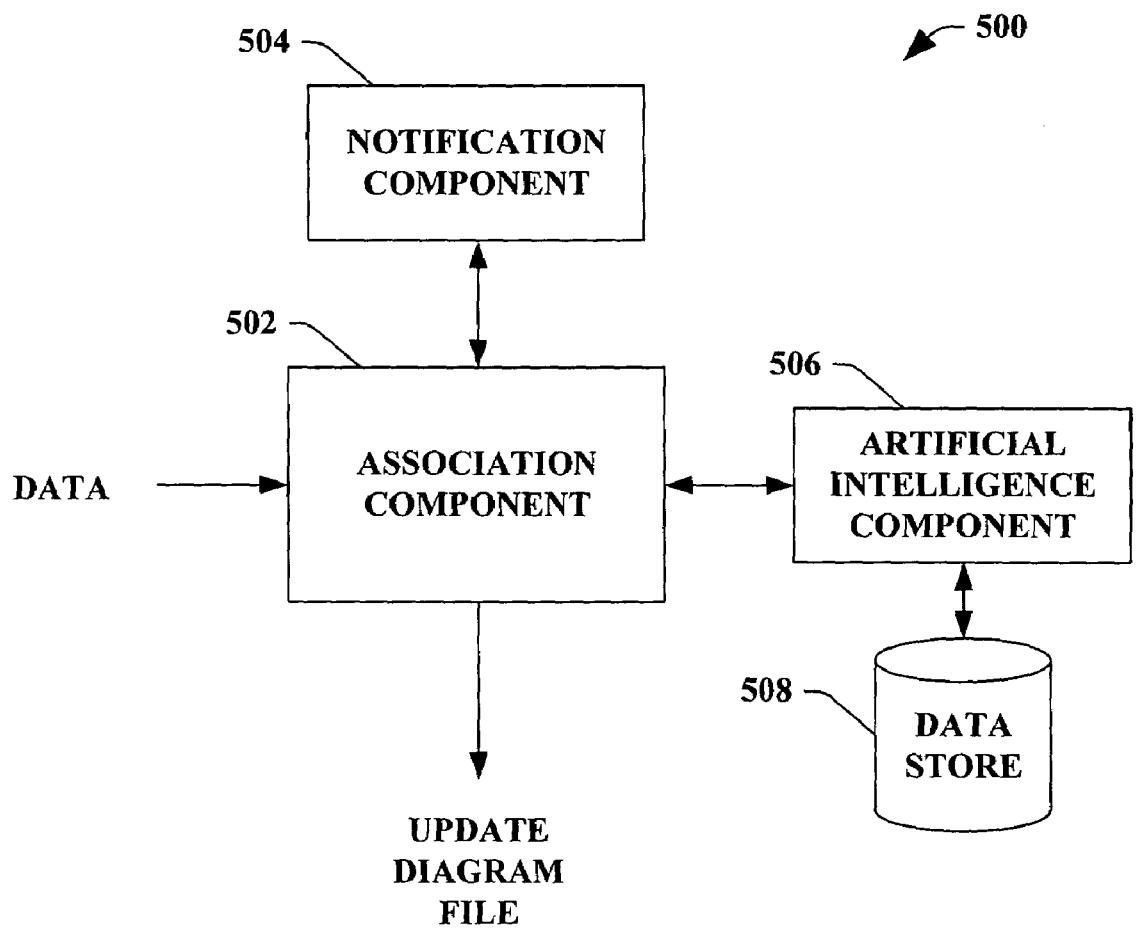
FIG. 5 illustrates a block diagram of an exemplary system that facilitates synchronizing code with a data representation application in accordance with an aspect of the subject invention.

FIG. 5 illustrates a system 500 that facilitates synchronizing a diagram file with types within a source code by employing an association component 502 that allows a data representation application to display the diagram file accurately. The association component 502 utilizes, for example, a hash value to generate a distance metric and a match confidence in order to associate an orphaned shape to a type. When the diagram file is not open and/or accessed during a renaming of the type, the code containing the type and the diagram file is not synchronized—generating orphaned shape(s). In order to associate an orphaned shape to a type, the association component 502 stores additional information in the diagram file upon closing and/or saving. If renaming of type(s) occurs without the diagram file accessed and/or opened, the association component 502 utilizes a hash value of the stored information and the type information in order to associate an orphaned shape to the type it represents.

Furthermore, the system 500 can further include a notification component 504 that can notify a user of orphaned shapes and/or the associations made based on the association component 502. The notification component 504 can notify a user by generating, for example, a text document, a comment in code, a visual image in relation to the diagram file, an audio alert, a video, a table, a tag within code, an email to the user, an attachment, an update to a website, etc. It is to be appreciated the notification component 504 can notify the user of at least one of associations to be made, associations made, determined edits that affect associations, distance metrics associated to associations, and/or match confidences for each association.

In accordance with one aspect of the subject invention, an artificial intelligence component 506 can infer configurations relating to the association component 502 to facilitate synchronizing a diagram file with a code. In order to facilitate synchronizing the diagram file with code, the artificial intelligence component 506 can utilize a data store 508 to store historic data and/or user profiles. For example, the artificial intelligence component 506 can infer type name changes within code while the diagram file is closed and/or inaccessible. The artificial intelligence component 506 can utilize user profiles and/or historic data stored in a data store 508 in order to anticipate renaming schemes by a specified user. For instance, a user typically codes systematically and consistently in order to be efficient within a program language. Thus, with a user profile and historic data related to the user, the artificial intelligence component can infer renaming techniques and/or schema in order to facilitate the association of an orphaned shape to a type.

In accordance with yet another aspect of the subject invention, the artificial intelligence component can optimize the association of orphaned shapes to types by optimizing hashing techniques, assignment techniques, and/or threshold level(s). For example, the artificial intelligence component 506 can infer the optimized hashing technique and/or assignment techniques based at least upon the code size, complexity, number of types, number of orphaned shapes, etc. Moreover, the artificial intelligence component 506 infers a threshold based at least upon, for example, a user preference and/or code (e.g., size, complexity, number of types, number of orphaned shapes, . . . ). For example, the threshold level for associating an orphaned shape can be set to 0.8 based at least upon a number of orphaned shapes. However, the artificial intelligence component can infer a higher level such as 0.85, if the number of orphaned shapes increased to ensure quality results.

FIGS. 6-9 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

Figure 6:
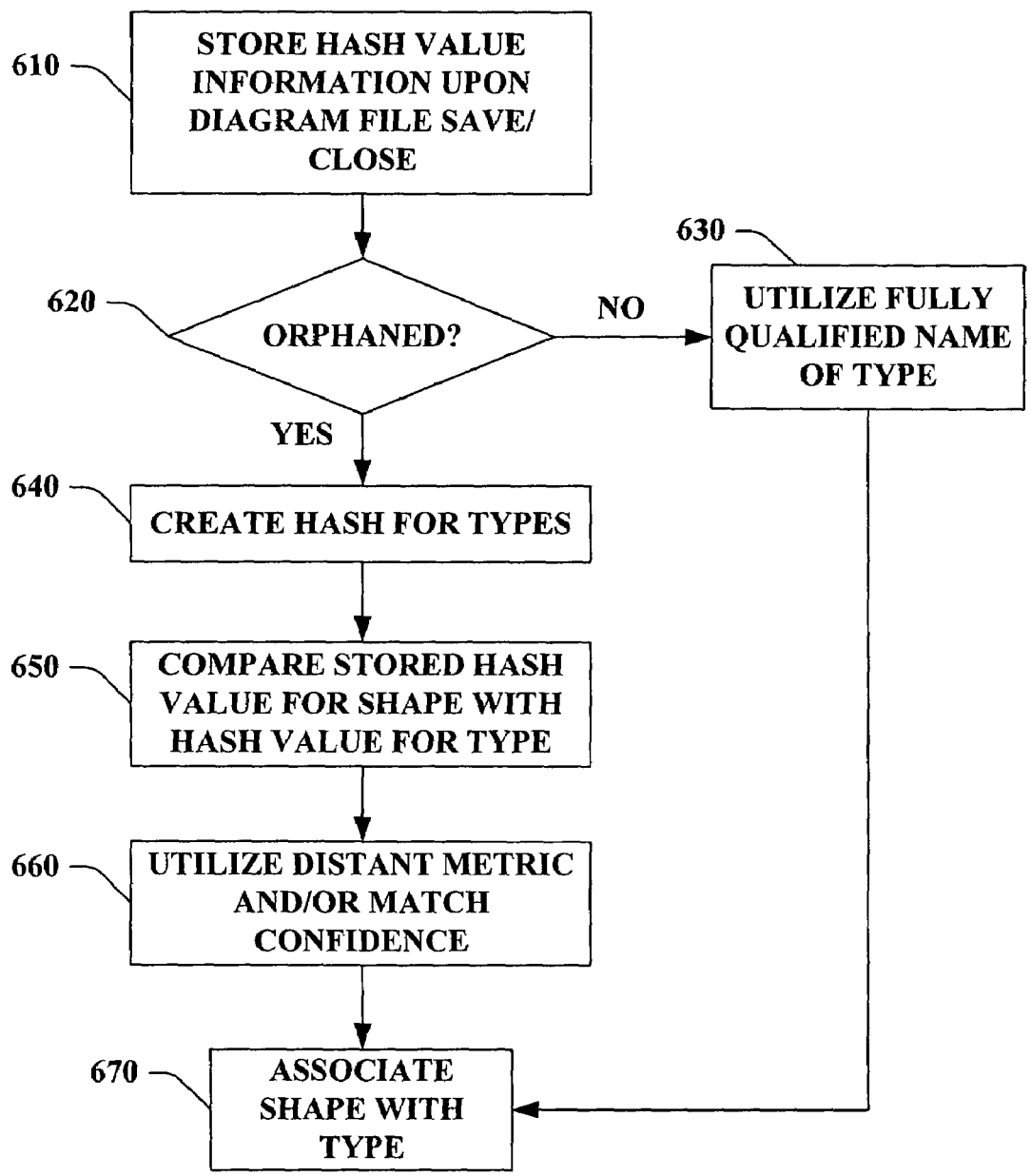
FIG. 6 illustrates a flow chart of an exemplary methodology that facilitates associating a shape from a data representation application to a type in accordance with an aspect of the subject invention.

FIG. 6 illustrates a methodology 600 that facilitates the synchronization of a diagram file with code such that an orphaned shape is associated to a type. An edit within a code such as a renaming of a type can cause non-synchronization of the code and a diagram file when the related data representation application (e.g., class designer) is not open and/or accessed. The diagram file allows the data representation application to display types, members and/or relationships thereto from a code. Thus, the code is a master while the diagram file is a slave (e.g., the diagram file and data representation application display is based upon the code). At 610, additional information is stored in the diagram file. The additional information can be, but not limited to, a filename that the type was located in (e.g., obtained from the model code), qualified name of the type, and/or a hash value constructed from the member names of the type that the shape was associated to when the diagram file was saved and/or closed. For example, the hash can be a 256 bit hash value. Next, the methodology 600 determines if there is an orphaned shape at 620. If an orphaned shape is not determined and/or located, the process continues at 630 where the shape is associated to a type utilizing the fully qualified name of the type. Yet, if an orphaned shape is determined, the process continues at 640 where a hash is created for the types. For example, a 256 bit hash can be utilized; yet it is to be appreciated that any suitable hash technique can be utilized that facilitates calculating the match coefficient. Once the hash has been created, the stored hash value for the shape and the hash value for the type are compared at 650. At 660, a distance metric is utilized based at least upon the hash comparison. If there is only one orphaned shape, the process associates the orphaned shape with the type that has the closest distance metric (e.g., highest percentage). Yet, if there is more than one orphaned shape, the process utilizes a match confidence in order to association shapes to types to optimize the pairings. Based at least in part upon the distance metric (e.g., based at least in part upon the number of orphaned shapes), the shape is associated with a type it represents at 670.

FIG. 7 illustrates a methodology 700 that facilitates associating an orphaned shape to a type by utilizing a hash value algorithm utilizing the names of members of the original type and the type shapes in either the substantially similar file or substantially same namespace as the original type. At 702, a bit array of 256 bits is created and initialized that can be named, for example, bitArray. It is to be appreciated that any suitable length bit array can be utilized in conjunction with the algorithm any suitable length of bitarray. At 704, a member of the type is analyzed. If the member of the type is a constructor or destructor at 706, the process moves to the next member at 708 which proceeds to 704 to analyze the next member of the type. If the member is not a constructor or destructor, the process retrieves the name of the member and utilizes a GetHashCode( ) to obtain a 32-bit hash value at 710. At 712, the process retrieves the least significant byte of the hash value as an unsigned byte (e.g., where the value will be between 0 and 255). At 714, for each member in the type the process utilizes bitArray[n]=true. Next at 716, if there are more members, the process moves to the next member at 718. If there are no members, the process ends. It is to be appreciated that this particular hash technique provides a compact storage of data and provides an easy method to calculate the distance between two types using the hash values. However, any suitable hash technique that provides these two characteristics can be utilized.

Figure 8:
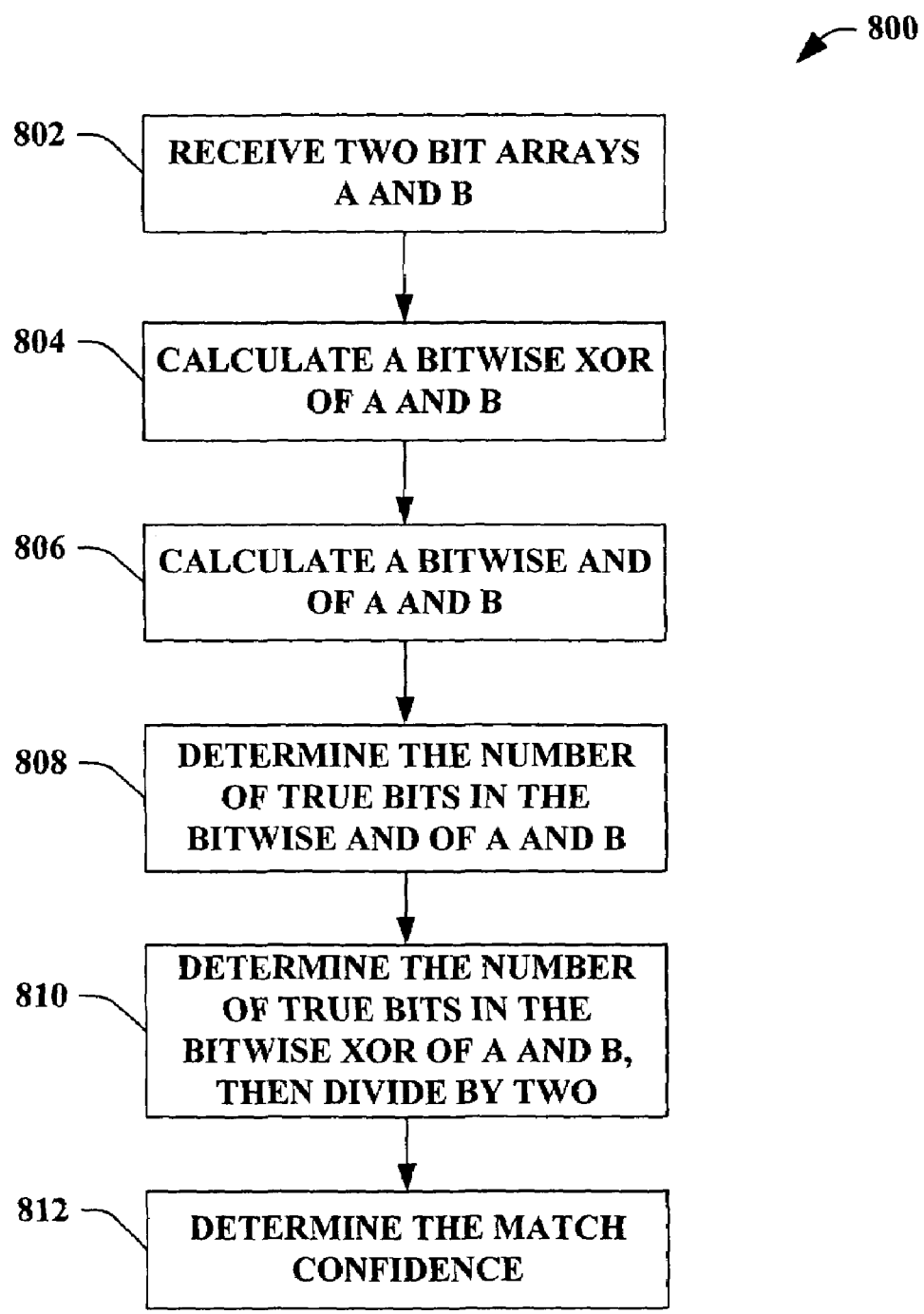
FIG. 8 illustrates a flow chart of an exemplary methodology that facilitates synchronizing code with a data representation application in accordance with an aspect of the subject invention.

FIG. 8 illustrates a methodology 800 that facilitates associating an orphaned shape to a type by employing a distance metric in order to synchronize a diagram file with a type. The process 800 utilizes a hash value (e.g., 256 bit array) such as, for example, the hash value created and initialized in methodology 700. It is to be appreciated any suitable hash value can be employed in order to utilize the distance metric in methodology 800. The distance metric is performed for each orphaned shape's type(s) that are in either the same file or same namespace as the shapes original typewith the stored hash value. At 802, two bit arrays are received, such as, for example, bit array A and bit array B. At 804, the bitwise XOR of A and B is calculated and defined as, for example, xorArray. Next at 806, the bitwise AND of A and B is calculated and defined as, for example, andArray. At 808, the number of true bits in the bitwise AND of A and B is determined as, for instance, int numMatches. Next at 810, the number of true bits in xorArray is divided by two and defined as, for example, int numDiffs. At 812, the match confidence is determined by utilizing the equation: match confidence=numMatches/(numDiffs+numMatches), yielding a number between 0 and 1, wherein the higher the value the more confident the association.

Figure 9:
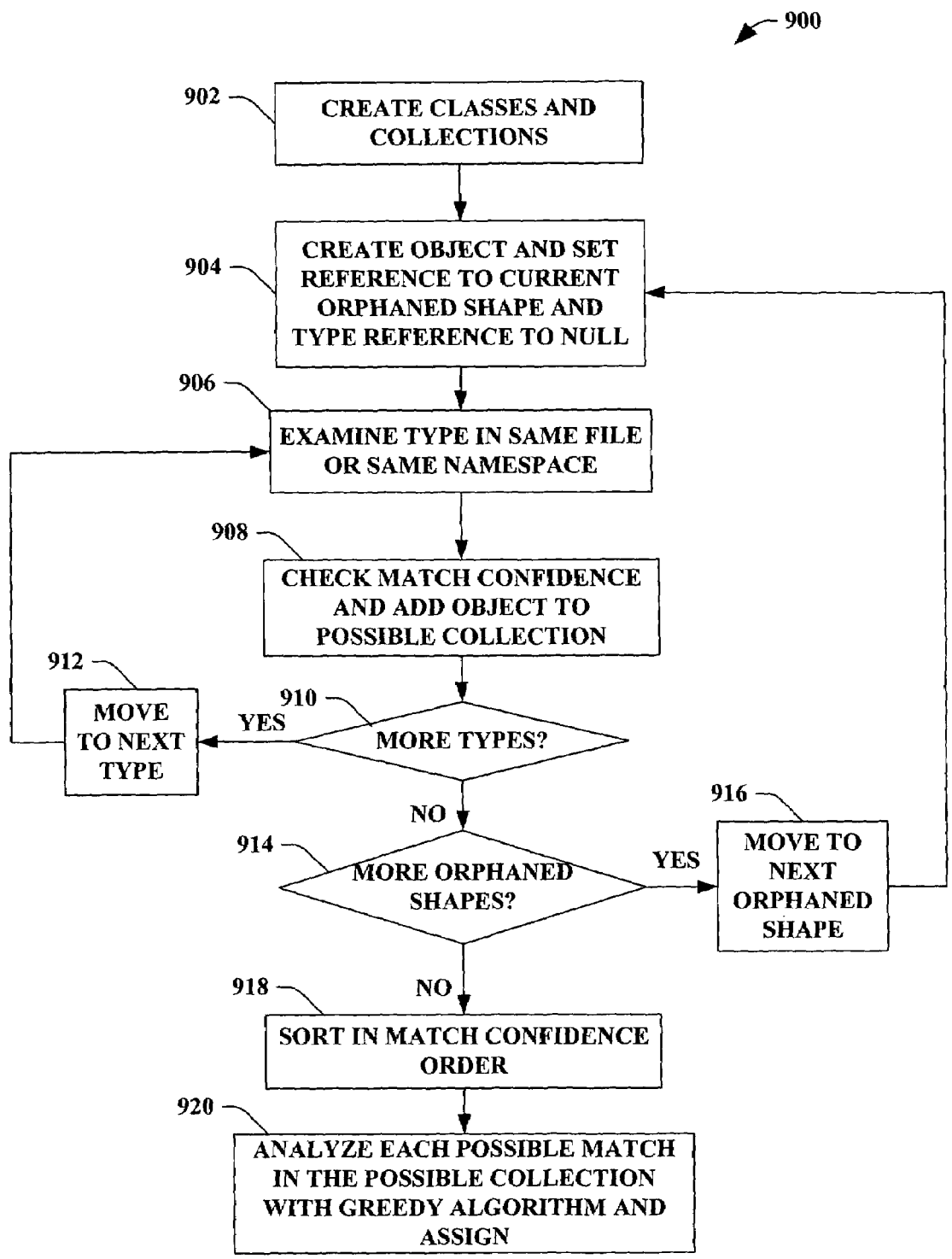
FIG. 9 illustrates a flow chart of an exemplary methodology that facilitates synchronizing code with a data representation application in accordance with an aspect of the subject invention.

FIG. 9 illustrates a methodology 900 that facilitates associating more than one orphaned shape to a type wherein a match confidence is utilized in order to optimize the pairing of one orphaned shape to one type. At 902, classes and collection of objects are created. A class called, for example, ShapeTypeMatch contains a reference to an orphaned shape and to the type that it is assigned (e.g., initially null). Additionally, a collection of ShapeTypeMatch objects is created called, for example, ShapeTypeMatchCollection. Moreover, there is a class called, for example, PossibleMatch, which contains a reference to ShapeTypeMatch and to a type and contains a match confidence. Also, a collection of PossibleMatch objects called, for example, PossibleMatchCollection is created.

At 904, an object is created called, for example, STMATCH wherein the orphaned shape reference is set to the current orphaned shape and the type reference is set to null. Additionally, a reference to STMATCH is stored in ShapeTypeMatchCollection. At 906, types in either the same file or same namespace as the original type are, examined. At 908, the match confidence is checked between the shape and the type. If the match confidence is greater than a certain minimum threshold (e.g., 0.8), a PossibleMatch object is created, and the ShapeTypeMatch reference is set to point to STMATCH and its type reference is set to point to the current type and the match confidence to the generated match confidence. The process then adds the PossibleMatch object to PossibleMatchCollection. At 910, if there are more types, the process moves to the next type at 912, wherein that type is examined at 906. If there are no more types, the process continues at 914.

At 914, the process determines if there are more orphaned shapes to be analyzed and/or associated. If there are more shapes, the process moves to the next orphaned shape at 916, wherein the process continues at 904 to analyze the orphaned shape and related types. If there are no more orphaned shapes, the process continues at 918, where PossbileMatchCollection is sorted in match confidence order wherein the highest match confidence is first. At 920, each match in the PossibleCollection is analyzed with, for example, a greedy algorithm and assigned such that each orphaned shape is with one type.

In particular, each PossibleMatch in PossibleMatchCollection is looped through. If the type in the Possible Match has been assigned to an orphan already, skip to the next item (e.g., maintain a hashtable of the fully qualified names of all the types that have been assigned, and utilize a lookup in the table). Next, the ShapeTypeMatch object is checked to determine if the orphaned shape has been assigned to a type already (e.g., make sure the 'assigned-to' reference is null). If the orphaned shape has been assigned, go to the next item. The process then assigns the type to the orphan (e.g., set the 'assigned-to' reference to the ShapeTypeMatch object, and add the fully qualified name of the type to the hashtable of assigned types). It is to be appreciated the process can examine through the ShapeTypeMatchCollection and associate the orphaned shapes to their assigned types. Moreover, if the assigned type is null, the heuristic did not find a type that generated a close association. The result is that each orphan gets assigned to a type that generates the most match-confidence, unless there is another orphan that generated a higher match confidence with that type.

Figure 10:
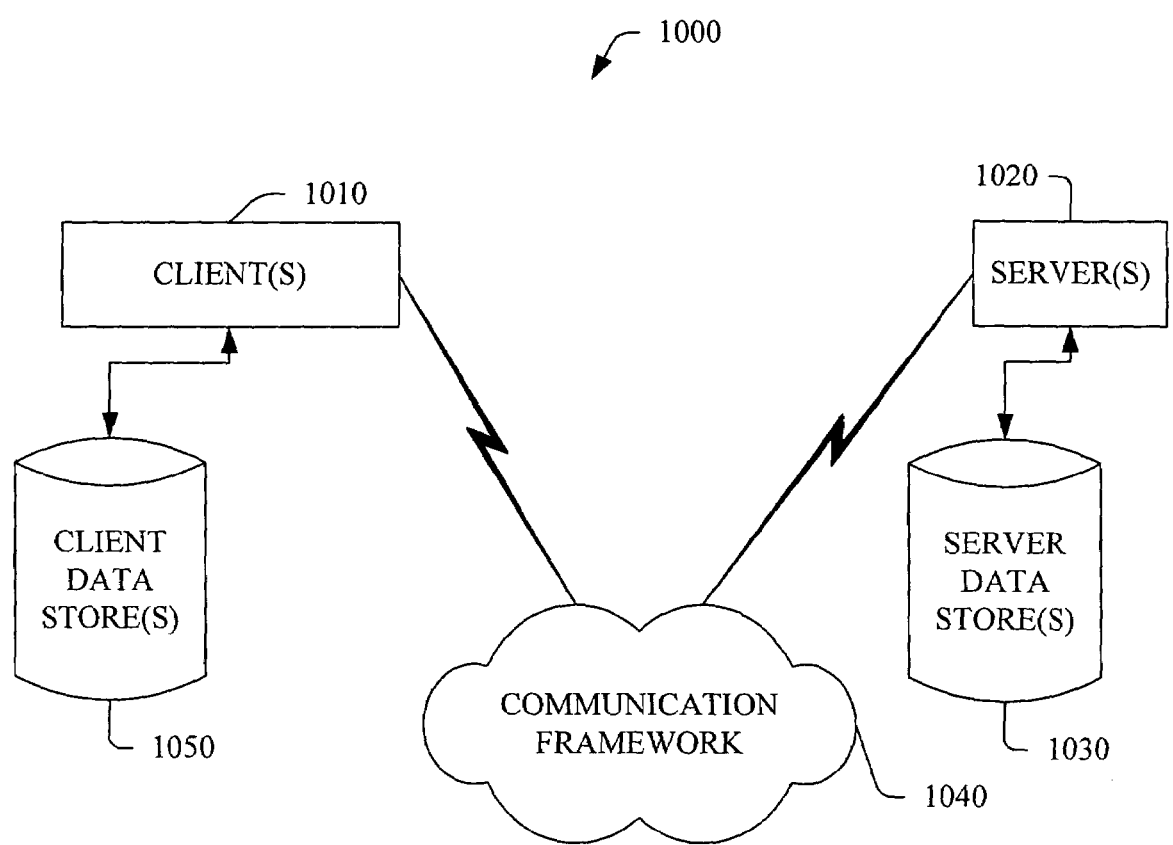
FIG. 10 illustrates an exemplary networking environment, wherein the novel aspects of the subject invention can be employed.
Figure 11:
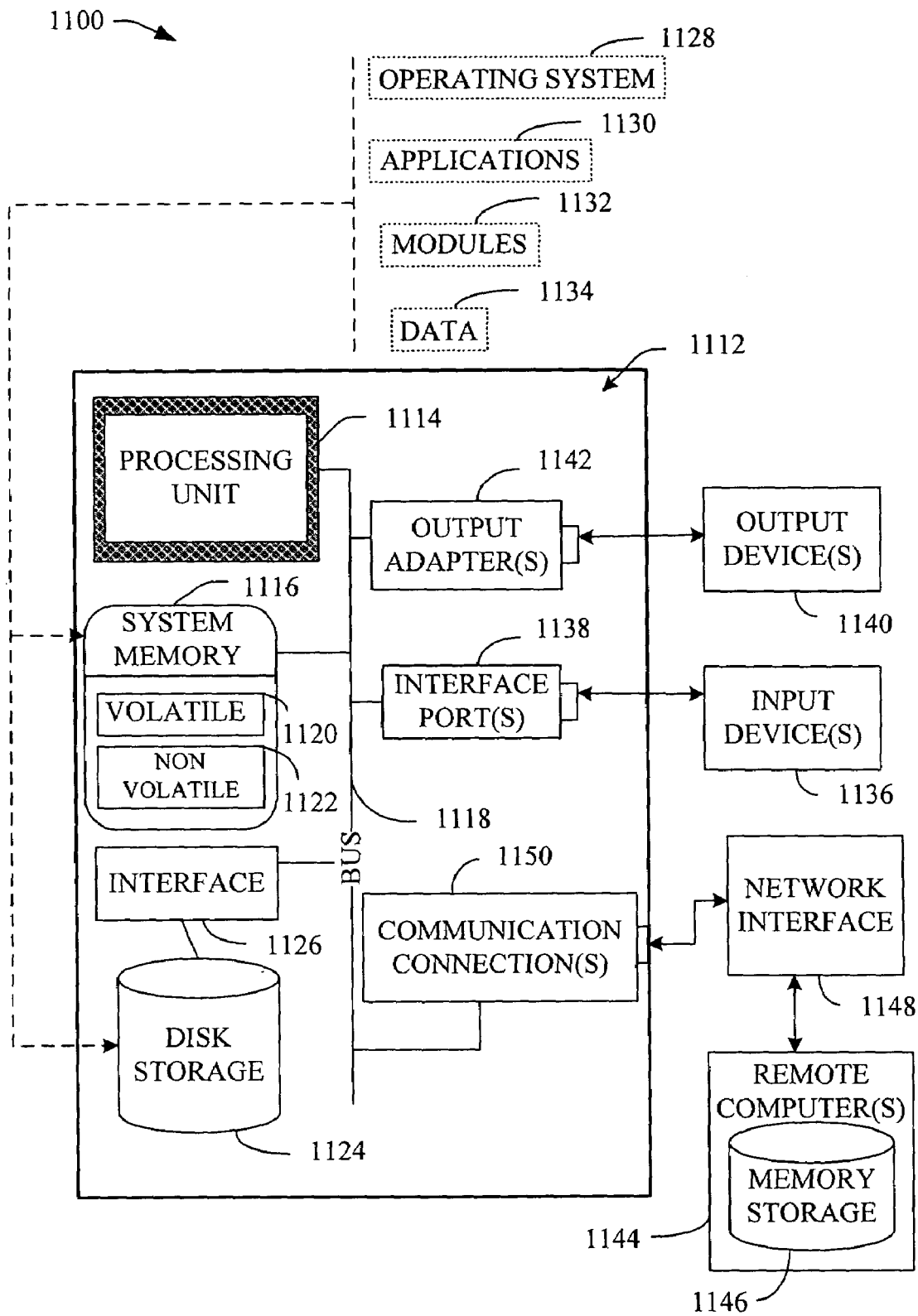
FIG. 11 illustrates an exemplary operating environment, wherein the novel aspects of the subject invention can be employed.
Figure 12:
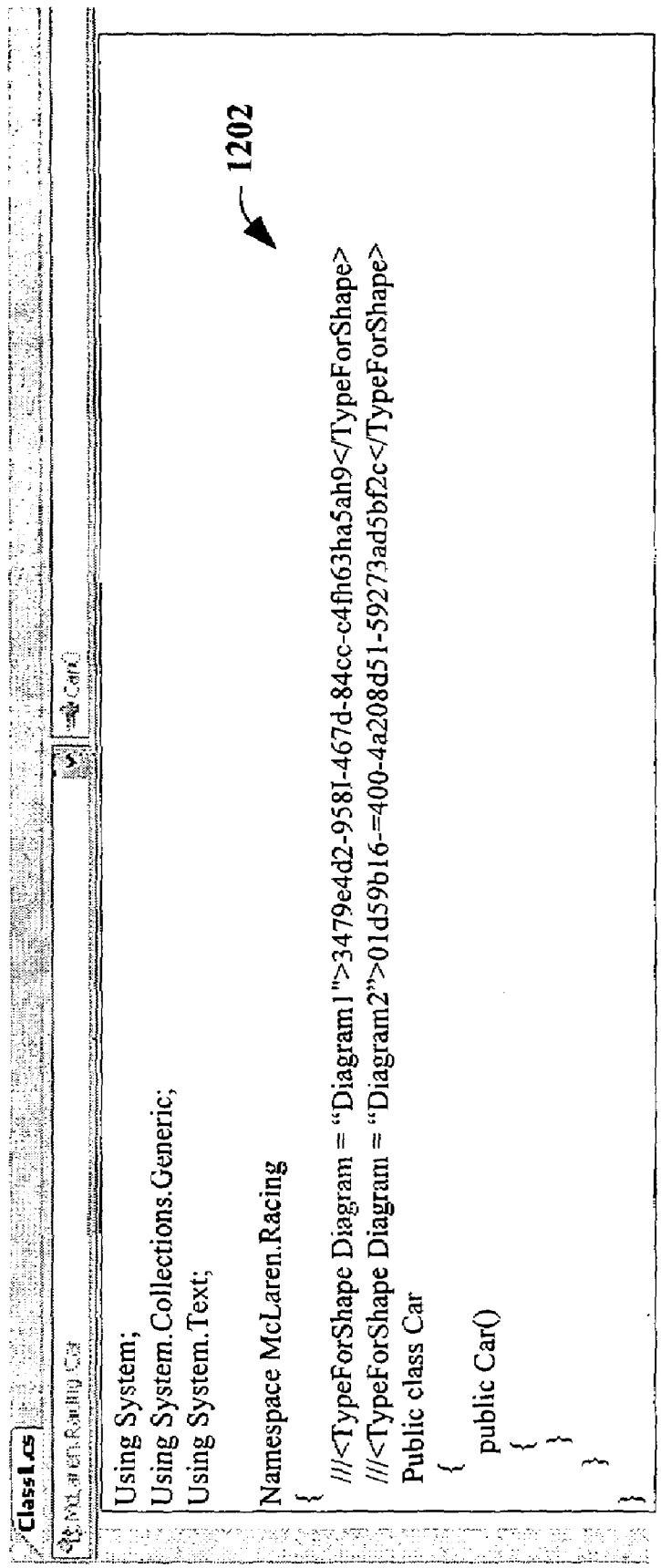
FIG. 12 illustrates a sample portion of code wherein XML tags are utilized to facilitate synchronizing code.

In order to provide additional context for implementing various aspects of the subject invention, FIGS. 10-11 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCS1).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that facilitates associating a shape on a diagram with an associated underlying type, comprising at least one processor that executes the following computer-executable components:
   a component that receives a data representation diagram file that comprises at least one shape; and
   an association component that performs a search among a plurality of types in one or more source code files for a type that corresponds to the shape based on a respective hash value associated with an original type related with the shape such that the association component associates the type to the shape within the data representation diagram file, wherein the respective hash value is a comparison between a hash value constructed from one or more member names of the type that the shape is associated to when the data representation diagram file is saved and a hash value for one or more types in either a substantially similar file or a substantially similar namespace as the original source code file for the type.

2. The system of claim 1, the association component searches the plurality of types within the one or more source code files comprising at least one edit that occurs when the data representation diagram file is closed.

3. The system of claim 2, the association component associates at least one shape of the data representation diagram file to at least one type in the one or more source code files.

4. The system of claim 2, the edit that occurs when the data representation diagram file is closed is a renaming.

5. The system of claim 2, the association component associates the shape in the data representation diagram file to the type within the one or more source code files utilizing the fully qualified name of the type in the one or more source code files comprising an edit with the data representation diagram file open.

6. The system of claim 1, the data representation diagram file relates to a class designer modeling tool.

7. The system of claim 1, the search is a heuristic search.

8. The system of claim 1, the association component utilizes a distance metric to indicate correlation between the type and the shape.

9. The system of claim 1, the association component utilizes a match confidence to associate the shape to at least one type.

10. The system of claim 9, the match confidence utilizes an adjustable threshold to determine valid matches to utilize.

11. The system of claim 9, the association component utilizes a greedy algorithm to assign types to orphaned shapes when there are more than one orphaned shapes.

12. The system of claim 1, the respective hash value is a 256 bit hash that is a compact storage for information to easily calculate a match co-efficient.

13. A computer readable medium having stored thereon the components of the system of claim 1.

14. A computer-implemented method that facilitates associating a shape within a diagram file to a type file, comprising:
    calculating a hash value from the names of the members of the type file;
    storing the hash value upon diagram file save as a hash value stored;
    determining when the shape cannot be associated with a type file;
    calculating a hash value for the type in either the substantially similar file or the substantially similar namespace as the shapes original type
    comparing the hash value stored with the hash value for the type in either a substantial similar file or a substantially similar namespace; and
    associating the unassociated shape with the type based at least upon the comparison.

15. The computer-implemented method of claim 14, further comprising creating a data packet that communicates between the component that receives the diagram file and the association component.

16. The computer-implemented method of claim 14, calculating the hash value further comprises:
    creating a 256 bit array;
    analyzing members within the type;
    utilizing a GetHashCode() on a name of the member;
    retrieving a least significant byte of the hash value as an unsigned byte; and
    utilize bitArray[n]=true, where n is the value of a last byte.

17. The computer-implemented method of claim 14, further comprises:
    utilizing a distance metric to indicate a correlation between the type and the shape; and
    utilizing a match confidence to associate the shape to at least one type.

18. The computer-implemented method of claim 17, calculating the distance metric further comprises:
    receiving two 256 bit long arrays;
    calculating a bitwise XOR of the two bit long arrays;
    calculating a bitwise AND of the two bit long arrays;
    defining a first integer as a number of resultant true bits of the bitwise AND;
    defining a second integer as a number of resultant true bits of the bitwise XOR; and
    utilizing a match confidence computed as the first integer divided by a quantity of the first integer added to the second integer.

19. A computer implemented system that facilitates associating a shape to a type, comprising:
    means for calculating a hash value from one or more names of one or more members of a first type in a source code file;
    means for determining when a data representation shape cannot be associated to the first type;
    means for comparing the hash value from the one or more members of the first type with a hash value for one or more second types in either a substantially similar file or a substantially similar namespace as the shapes first type; and
    means for associating an orphaned shape with the first type based at least upon the comparison.

* * * * *